(No Model.)
T. W. BOYLE.
HOE.
No. 260,363. Patented July 4, 1882.
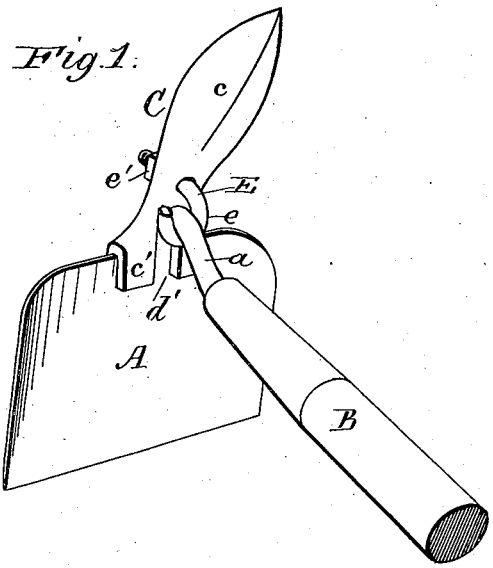
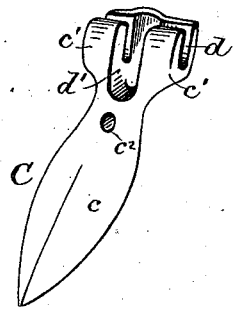
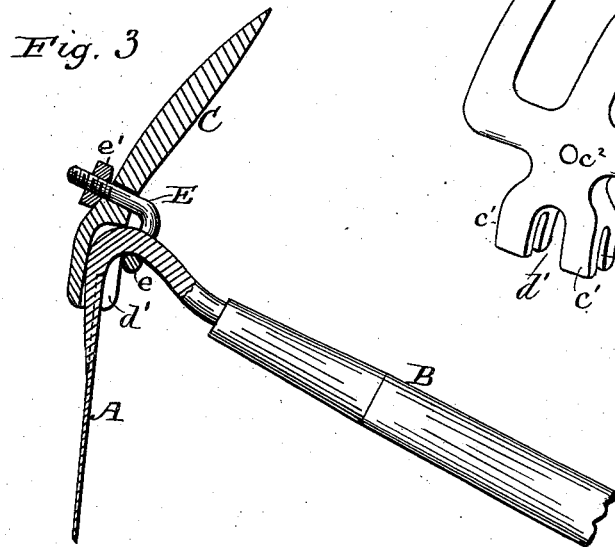
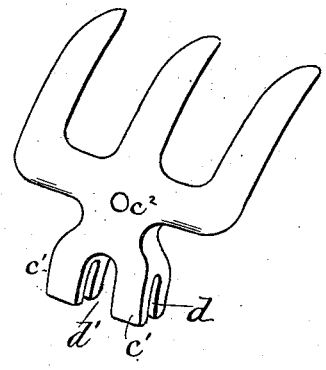
Witnesses:
W. B. Masson
C. C. Shepherd
Inventor
Thaddeus W. Boyle
by. E. E. Masson
atty

UNITED STATES PATENT OFFICE.

THADDEUS W. BOYLE, OF AUGUSTA, GEORGIA.

HOE.

SPECIFICATION forming part of Letters Patent No. 260,363, dated July 4, 1882.

Application filed May 3, 1882. (No model.)

*To all whom it may concern:*

Be it known that I, THADDEUS W. BOYLE, a citizen of the United States, residing at Augusta, in the county of Richmond and State of Georgia, have invented certain new and useful Improvements in Hoes, of which the following is a specification.

My improvement relates to improvements in ordinary hand-hoes; and the object of my improvement is to provide them with a detachable prong rake or digger having its lower end adapted to straddle the blade and handle of the hoe and be securely bolted to the latter in a simple and inexpensive manner. I attain these objects by the construction illustrated in the accompanying drawings, in which—

Figure 1 represents a perspective view of a hoe with one form of prong secured thereto. Fig. 2 is a perspective view of the prong detached from the hoe. Fig. 3 is a vertical section through the hoe blade and prong, and Fig. 4 shows a hoe attachment having three prongs.

Heretofore hoes have been provided with single-prong diggers or with many prongs or rake-teeth formed in one piece with the hoe-blade; but prongs thus made are generally thin and devoid of strength. Hoes of peculiar construction have been provided with detachable prongs secured to the handle in front of the hoe-blade; but for various reasons these prongs have not come in extensive use, as they cannot be secured to the form of hoe most generally found in the market, and my object is to provide the latter with an inexpensive cast-metal prong of any desired shape.

In the accompanying drawings, A represents a hoe-blade provided with an ordinary goose-neck-bent shank, $a$, having its outer end secured, as usual, to a handle, B. To this blade and shank is secured a prong, C, of such size, curvature, and strength as to be well adapted for use upon hard ground. This prong is formed of a double-beveled pointed blade, $c$, at one end and a pair of shoulders, $c'$, at the other. These shoulders $c'$ are provided with a longitudinal groove, $d$, of such width as to easily straddle the hoe-blade A, and a transverse socket, $d'$, to receive the upper part of the shank $a$ of the handle, and by these means the prong C is steadied in position upon the upper edge of the hoe-blade. It is secured there by means of a small bolt, E, passing through a hole, $c^2$, made in the body of the prong, and this bolt has one end so bent or hooked at $e$ as to nearly surround and engage with the shank $a$, while the other end is provided with a nut, $e'$, bearing against the forward side of the prong. This prong is bent backward above its shoulders $c'$ to increase its effectiveness as a digger.

Although this attachment is shown in three of the figures as having only one prong, it is evident that a digger with two or more prongs or a rake could be secured in the same manner to the hoe-blade and handle; or a forked clip may be used to pass under the handle and against the sides of the prong, and be secured in front by a bolt or by a small plate and two nuts uniting the ends of the clip; but I prefer the construction shown in the drawings as being the simplest.

The transverse groove or socket $d'$ may extend clear through the front portion of the attachment, as shown in Fig. 4; but I prefer the construction shown in the other figures. The prong or hoe attachment, although preferably made of cast metal, can also be of plate metal, notched, grooved, and bent to straddle the hoe-blade.

Having now fully described my invention, I claim—

1. A hoe provided with a detachable prong having a transverse socket, $d'$, adapted to straddle the shank of the hoe, and a fastening passing under said shank and secured to the front of the prong, substantially as and for the purpose described.

2. A hoe-prong provided with shoulders $c'$, longitudinal grooves $d$ therein, and a socket, $d'$, substantially as and for the purpose described.

3. The combination of a hoe-blade and its shank with a prong having shoulders adapted to rest upon the back edge of the blade, a socket to straddle the hoe-shank, and a bolt having one end bent to engage with said shank and the other secured to the front side of the prong, substantially as and for the purpose described.

THADDEUS W. BOYLE.

Witnesses:
 E. H. WALTON,
 S. H. W. SMITH.